GEORGE W. MOORE.
Improvement in Boring Tools.
123,786.    Patented Feb. 20, 1872.
Fig. 1
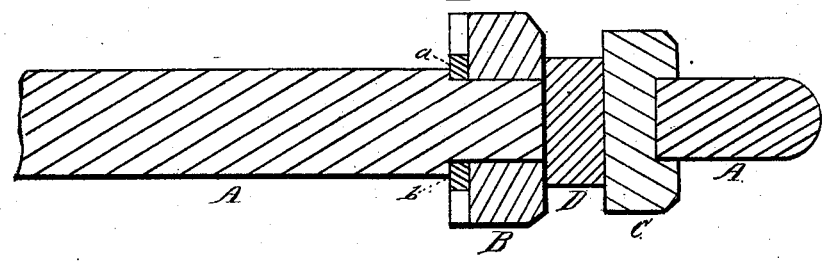
Fig. 2
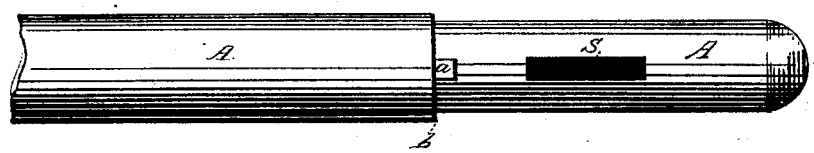
Fig. 3    Fig. 5    Fig. 6    Fig. 4
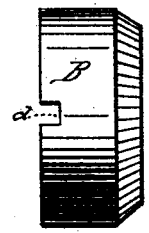 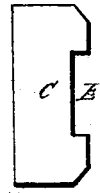 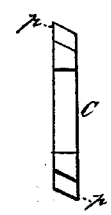 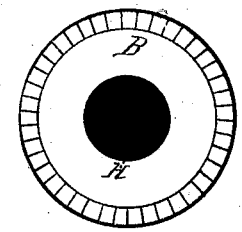
Witnesses,
H. M. Kelley
James S. Brown
Inventor:
George W. Moore No. 123,786

UNITED STATES PATENT OFFICE.

GEORGE W. MOORE, OF HARRISBURG, PENNSYLVANIA.

IMPROVEMENT IN BORING-TOOLS.

Specification forming part of Letters Patent No. 123,786, dated February 20, 1872.

I, GEORGE W. MOORE, of Harrisburg, in the county of Dauphin and State of Pennsylvania, have invented certain Improvements in Rose-Bits and Cutters, for boring metallic wheels, pulleys, &c., of which the following is a specification:

Nature and Objects of the Invention.

My invention consists in placing on the boring-spindle, just above or behind the cutter, an adjustable rose-head bit of any size required, which, being carried by the spindle, follows the cutter and finishes the hole at a single operation instead of two operations, as required by the ordinary methods.

Description of Accompanying Drawing.

Figure 1 is a longitudinal section. Fig. 2 is a view of the boring-spindle, showing the slot S for receiving the cutter C and key D; also the pin $a$ for holding the rose-bits from turning. Fig. 3 is a side view of the rose-head bit with its notch $d$ for receiving the pin $a$ of the spindle. Fig. 4 is an end view of the rose-head bit with the hole H through which the spindle passes. Fig. 5 is a side view of the cutter with its notch E, which passes on each side the spindle below its slots, thus preventing lateral motion in the cutter. Fig. 6 is an edge view of the cutter, designed to show the angle of the cutting-edges $p\ p$.

General Description.

On an ordinary boring-spindle, as seen in Fig. 2, I place a rose-head bit, constructed as follows: In a piece of good steel of the required size I make a hole which shall fit accurately the small end of the boring-spindle. This piece of steel I now turn down to the size I want, beveling off its front end as much as desired. Into this beveled surface I sink a series of triangular notches at such distances apart that when filed to the proper depth their outer edges shall be sharp. These notches thus formed serve as cutters. Thus finished the rose-head bit is seen in Fig. 3. In the back end of this bit I place a notch, $d$, which receives the pin $a$ of the spindle, which prevents it from turning on the spindle. After giving this bit, thus constructed, the proper temper, I place it on the spindle in its proper position. The length of the bit is equal to the distance from the shoulder $b$ on the boring-spindle to the slot S, or a little longer, so that the key D, when driven in, shall come in contact with the end of the bit instead of the end of the slot. By this means I secure the bit firmly in its place. The cutter C is constructed in the ordinary manner, its length being equal to the diameter of the rose-head minus the thickness of cut I wish the rose-head to take out. The key D is placed in the slot S of the cutter-spindle, between the cutter and rose-bit head, and serves to secure both in their places. It is of such a length that when in position its ends shall be clear of the sides of the hole made by the cutter passing before it. This combination of an adjustable rose-head bit with a cutter enables me to secure the advantage of adapting any number of different-sized bits to a single boring-spindle, and at the same time to accomplish at one operation the same amount of work which has heretofore required two.

The usual mode of boring wheels is to first pass through the cutter, and then, at a second operation, to pass through a rose-bit. The difficulty of keeping the rose-bit in a line with the hole previously made by the cutter often renders the finished operation of the rose-bit imperfect, and renders subsequent accuracy in fitting impossible. In my invention, the rose-bit head being on the same boring-spindle with the cutter necessarily avoids this difficulty and secures a degree of accuracy obtained by no other device known at present.

I am aware that cutters and boring-spindles similar to those I use are not new. I am also aware that rose-bits are in use at present. I therefore make no claim to these devices distinct from my mode of constructing and combining them; but What I do claim as my invention, and wish to secure by Letters Patent, is—

I claim the rose-bit head B, constructed and operating as described, in combination with the boring-spindle A, cutter C, and key D, substantially as described, and for the purpose specified.

G. W. MOORE.

Witnesses:
H. M. KELLEY,
DANIEL S. BROWN.